Nov. 8, 1932.  A. T. WOOD  1,887,054
TRAILER COUPLER
Filed Aug. 14, 1931
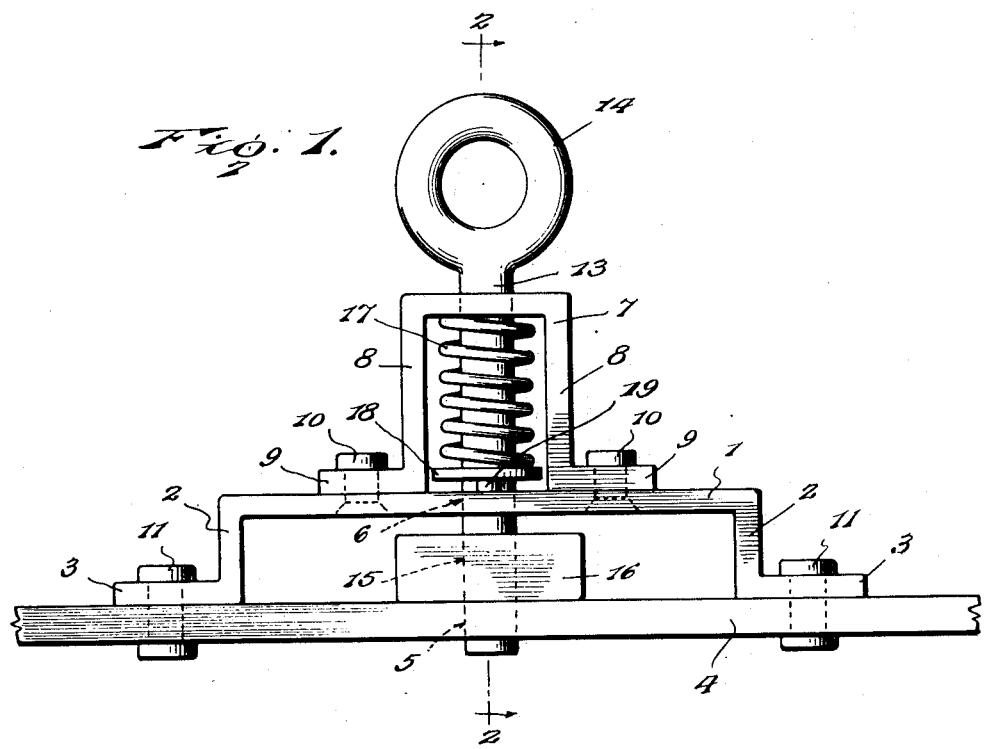
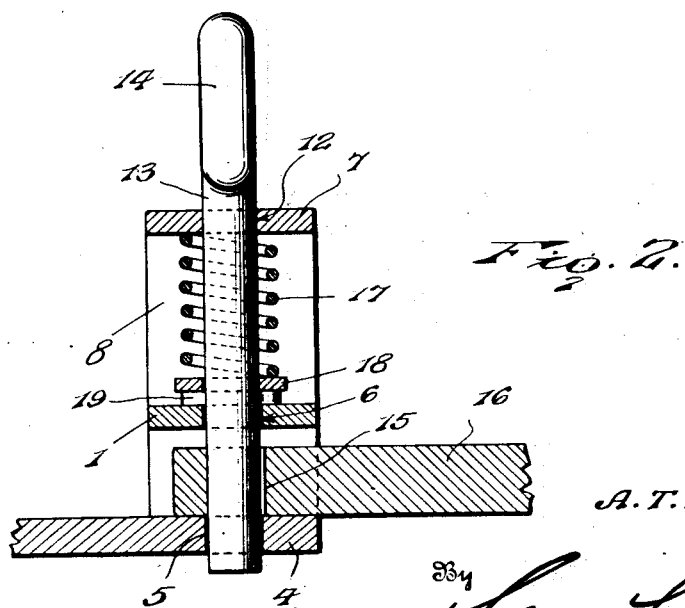
Inventor
A. T. Wood.
By Lacey & Lacey,
Attorneys Patented Nov. 8, 1932

1,887,054

UNITED STATES PATENT OFFICE

AUSTIN T. WOOD, OF PAINT ROCK, TEXAS

TRAILER COUPLER

Application filed August 14, 1931. Serial No. 557,169.

This invention relates to an improved trailer coupler and one object of the invention is to provide a coupler which may be easily applied to the rear portion of an automobile or other vehicle and by means of which the forward end of a trailer tongue may be securely but releasably connected with the automobile.

Another object of the invention is to so construct the coupler that when it is in place a plunger forming part of the coupler may be very easily moved into or out of position for engagement through an opening formed in a trailer tongue but will not be liable to accidentally slip out of place and release a trailer.

Another object of the invention is to provide a coupler which is very simple in construction and may be cheaply manufactured.

The invention is illustrated in the accompanying drawing wherein:

Figure 1 is a view in elevation showing a trailer tongue engaged with the coupler, and Figure 2 is a sectional view taken along the line 2—2 of Figure 1.

The improved coupler is intended to be mounted at the rear of an automobile or other vehicle and includes a bridge piece or yoke 1 preferably formed from a band of strong metal and having its end portions bent to form depending arms 2 and then again bent to form feet 3 adapted to rest upon a cross bar 4 forming part of the automobile or firmly secured thereto in any desired manner. The cross bar extends transversely of the automobile and is formed with an opening 5 located beneath an opening 6 in the yoke.

Upon the bridge or yoke is mounted a bracket 7 which is of an inverted U-shape and has its depending arm 8 bent to form feet 9 which rest upon the upper face of the bridge where they are firmly secured by rivets 10. Similar rivets 11 may be employed to secure the bridge to the cross bar or bolts may be used in place of the rivets 11. An opening 12 which is aligned with the openings 5 and 6 is formed in the bracket and through these openings is slidably engaged a bolt or plunger 13 which has an eye 14 at its upper end and is of sufficient length to project below the cross bar. Therefore the bolt will be firmly braced when it is passed through an opening 15 formed in the tongue 16 of a trailer and there will be no danger of the bolt or plunger being bent by the weight of a heavy load upon the trailer and the tongue allowed to slip out of place between the cross bar and the bridge.

It should also be noted that the bridge is of such length that the tongue may swing about the bolt or plunger as a pivot and thereby permit the trailer and an automobile towing it to easily turn a corner. The plunger is to be normally held in an operative position, and in order to do so there has been provided a strong spring 17 which fits about the plunger with its upper end bearing against the top of the bracket and its lower end resting upon a washer 18 which fits about the plunger and is held in place by a cotter key 19 passed through an opening formed in the plunger.

By this arrangement the plunger will be normally held in a depressed position as shown in Figures 1 and 2 but may be easily drawn upwardly by grasping its head or eye 14 and exerting pulling action. It should also be noted that if the spring should break, the cotter key may be easily removed and the plunger then withdrawn and after a new spring has been applied, the coupler may be easily and quickly reassembled.

What is claimed is:

A coupling for a trailer tongue comprising an elongated longitudinally disposed yoke having its opposite ends provided with lateral attaching feet adapted to be secured upon a portion of a vehicle and extend transversely thereof, a vertical bracket of the same width as the yoke rising from the intermediate portion of the yoke and provided with lateral attached feet resting on and secured to the upper face of the yoke, the yoke and bracket being provided with vertically alined openings, a vertical plunger slidably mounted through the openings in the bracket and yoke and having its upper end provided with an eye and its lower portion extended downwardly to engage through a tongue and seat in an opening formed in the portion of a vehicle upon which the yoke is secured, a washer fitted about the plunger above said yoke, a key extending through said plunger and supporting said washer, and a spring surrounding the plunger and housed within the bracket, one end of the spring bearing against the upper end of the bracket and the other end of the spring bearing against the washer to yieldably resist upward movement of the plunger to releasing position.

In testimony whereof I affix my signature.

AUSTIN T. WOOD. [L. S.]